United States Patent
Venkata et al.

(10) Patent No.: US 12,513,584 B2
(45) Date of Patent: Dec. 30, 2025

(54) MOBILITY SUPPORT FOR USER EQUIPMENTS WITH VARYING CAPABILITIES IN A WIRELESS NETWORK

(71) Applicant: Apple Inc., Cupertino, CA (US)

(72) Inventors: Naveen Kumar R. Palle Venkata, San Diego, CA (US); Christian Hofmann, Munich (DE); Gerhard Kilian Eichiner, Neubiberg (DE); Hong He, San Jose, CA (US); Jie Cui, San Jose, CA (US); Leilei Song, Sunnyvale, CA (US); Sharad Sambhwani, San Diego, CA (US); Wei Zeng, Saratoga, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 646 days.

(21) Appl. No.: 17/732,972

(22) Filed: Apr. 29, 2022

(65) Prior Publication Data
US 2022/0353762 A1    Nov. 3, 2022

Related U.S. Application Data

(60) Provisional application No. 63/182,354, filed on Apr. 30, 2021.

(51) Int. Cl.
*H04W 36/00* (2009.01)
*H04W 36/30* (2009.01)

(52) U.S. Cl.
CPC .......... *H04W 36/0085* (2018.08); *H04W 36/008355* (2023.05); *H04W 36/302* (2023.05)

(58) Field of Classification Search
CPC ..... H04W 36/0085; H04W 36/008355; H04W 36/302; H04W 8/22; H04W 76/15; H04W 48/10
See application file for complete search history.

(56) References Cited

U.S. PATENT DOCUMENTS 9,973,951 B1 *   5/2018   Rai ................. H04W 24/08
11,246,077 B2    2/2022   Tang
(Continued)

FOREIGN PATENT DOCUMENTS

| CN | 101663905 A | 3/2010 |
|----|-------------|--------|
| CN | 107211469 A | 9/2017 |

(Continued)

OTHER PUBLICATIONS

Fujitsu, "Cell reselection of RedCap UE," 3GPP TSG-RAN WG2 Meeting #113 electronic, R2-2100755, Jan. 25, 2021; 3 pages.
(Continued)

*Primary Examiner* — Anthony S Addy
(74) *Attorney, Agent, or Firm* — Sterne, Kessler, Goldstein & Fox P.L.L.C.

(57) ABSTRACT

Some aspects of this disclosure relate to apparatuses and methods for implementing techniques for support mobility in a wireless network for user equipments (UEs) with varying capabilities. A UE can receive a first system information from a serving base station, where the first system information includes a UE capability condition associated with a neighbor base station, and determine whether a UE capability meets the UE capability condition associated with the neighbor base station. When the UE capability condition is met, the UE can determine whether a first measurement of a first reference signal received from the serving base station and a second measurement of a second reference signal received from the neighbor base station satisfy a threshold condition. When the threshold condition is met, the UE can obtain a second system information from the neighbor base station, indicating the UE has performed handover to the neighbor base station.

20 Claims, 6 Drawing Sheets

(56) References Cited

U.S. PATENT DOCUMENTS

| | | | |
|---|---|---|---|
| 2016/0192261 A1* | 6/2016 | Wang | H04W 36/16 370/331 |
| 2017/0055192 A1* | 2/2017 | Johansson | H04W 36/302 |
| 2021/0266809 A1 | 8/2021 | Chen et al. | |
| 2022/0053517 A1* | 2/2022 | Kim | H04L 1/1812 |
| 2023/0232291 A1* | 7/2023 | Ramachandra | H04W 36/0079 455/436 |

FOREIGN PATENT DOCUMENTS

| | | |
|---|---|---|
| CN | 111132254 A | 5/2020 |
| EP | 3731562 A1 | 10/2020 |
| KR | 10-20200110327 A | 9/2020 |

OTHER PUBLICATIONS

3GPP Ts 38.331 V16.4.1, 3rd Generation Partnership Project; Technical Specification Group Radio Access Network; NR; Radio Resource Control (RRC) protocol specification (Release 16) 953 pages (Mar. 2021).
3GPP TS 38.304 V16.4.0, 3rd Generation Partnership Project; Technical Specification Group Radio Access Network; NR; User Equipment (UE) procedures in Idle mode and RRC Inactive state (Release 16) 38 pages (Mar. 2021).
3GPP TSG RAN WG1 Meeting #102-E, R1-2007283, "Summary on [102-e-NR-RedCap-05]," e-Meeting, Aug. 17-28, 2020, 27 pages.
3GPP TSG RAN WG1 Meeting #103-e, R1-2009543, "On complexity reduction features for NR RedCap UEs," e-Meeting, Oct. 26-Nov. 13, 2020, 19 pages.
European Search Report directed to related European Application No. 22169867.3, mailed Sep. 9, 2022; 11 pages.
Chinese Office Action and Search Report directed to related Chinese Application No. 202210469729.8, with machine translation attached, mailed Dec. 28, 2024; 16 pages.
Qualcomm Incorporated, "Impact of reduced capabilities on upper-layer procedures," 3GPP TSG-RAN WG2 Meeting #113-e, Online, Jan. 25-Feb. 5, 2021, R2-2100311; 4 pages.
Nokia, Ericsson, "Revised WID on support of reduced capability NR devices," 3GPP TSG RAN Meeting #91e, Electronic Meeting, Mar. 22-26, 2021, RP-210894 (Revision of RP-210873); 6 pages.
3GPP TS 38.306 V16.4.0 (Mar. 2021), 3rd Generation Partnership Project; Technical Specification Group Radio Access Network; NR; User Equipment (UE) radio access capabilities (Release 16); 151 pages.
Notice of Grant directed to Chinese Application No. 202210469729. 8, with translation attached, mailed May 29, 2025; 6 pages.

\* cited by examiner

MOBILITY SUPPORT FOR USER EQUIPMENTS WITH VARYING CAPABILITIES IN A WIRELESS NETWORK

RELATED APPLICATION

This application claims priority to U.S. Provisional Application No. 63/182,354, filed Apr. 30, 2021, which is incorporated by reference herein its entirety.

BACKGROUND

Field

The described aspects generally relate to mobility support for user equipments (UEs) with varying capabilities operating in a wireless network.

Related Art

The 3rd Generation Partnership Project (3GPP) has developed a new radio-access technology known as fifth generation (5G) New Radio (NR). The 5G wireless technology is primarily designed to address a wide range of use cases categorized into the enhanced mobile broadband (eMBB), ultra-reliable and low latency communication (URLLC), and massive machine-type communication (mMTC). Example applications may include industrial wireless sensor networks, video surveillance, or wearables. For various applications, user equipments (UEs) for a 5G wireless network can sometimes have reduced capability (RedCap) with lower cost and complexity, smaller form factor, and longer battery life.

SUMMARY

Some aspects of this disclosure relate to apparatuses and methods for implementing mobility support for user equipments (UEs) with varying capabilities operating in a wireless network. One UE can have a UE capability different from another UE, e.g., reduced capability (RedCap) such as lower cost and complexity, smaller form factor, and longer battery life. UE mobility can refer to the event that a UE can move or handover from communicating with a serving base station to a neighbor base station. A UE can be in different states, e.g., an idle state, an inactive state, or a connected state. Various operations may be performed to support UE mobility for UEs with varying capabilities in different states.

Some aspects of this disclosure relate to a UE. The UE can include a transceiver and a processor communicatively coupled to the transceiver. The transceiver can enable wireless communication with a serving base station and one or more neighbor base stations. In some embodiments, the UE can communicate with the serving base station using a first frequency band, and communicate with a neighbor base station using a second frequency band different from the first frequency band.

According to some aspects, the processor of the UE can be configured to receive, using the transceiver, a first system information from the serving base station. The first system information can include a UE capability condition associated with a neighbor base station of the one or more neighbor base stations. The processor of the UE is further configured to determine whether a UE capability meets the UE capability condition associated with the neighbor base station. The UE capability and the corresponding conditions can comprise one or more of a number of antenna ports of the UE, a data rate of the UE, or a latency requirement of the UE. In addition, the processor is configured to perform a first measurement of a first reference signal received from the serving base station. Moreover, responsive to the UE capability meeting the UE capability condition associated with the neighbor base station, the processor is configured to perform a second measurement of a second reference signal received from the neighbor base station. When the first measurement and the second measurement meet a threshold condition, the processor is configured to obtain a second system information from the neighbor base station, indicating the UE has performed handover to the neighbor base station.

Additionally and alternatively, the neighbor base station is a first neighbor base station, the UE capability condition is a first UE capability condition, and the first system information further includes a second UE capability condition associated with a second neighbor base station. In some examples, the UE capability does not meet the second UE capability condition.

According to some aspects, the neighbor base station is a first neighbor base station, the UE capability condition is a first UE capability condition. The first system information further includes a second UE capability condition associated with a second neighbor base station. The processor is further configured to perform a third measurement on a third reference signal from the second neighbor base station responsive to the UE capability meeting the second UE capability condition associated with the second neighbor base station. Afterwards, the processor is configured to select a next neighbor base station from one of the first neighbor base station and the second neighbor base station based on the first measurement, the second measurement, the third measurement, and the threshold condition. In some examples, the processor is configured to select the first neighbor base station to be the next neighbor base station when the second measurement is stronger than the third measurement. Moreover, the processor is configured to obtain the second system information from the next neighbor base station.

In some examples, the UE is registered with the serving base station and is in an idle state, the first system information is a first broadcast information received from the serving base station, and the second system information is a second broadcast information received from the neighbor base station. For example, the first system information can include information carried by System Information Block (SIB) 3 or SIB 4, and the second system information includes information carried by Master Information Block (MIB) or SIB 1. In addition, the first system information can include the threshold condition, and the threshold condition can specify an offset between the first measurement and the second measurement. Moreover, the first system information can further include an indication on whether the neighbor base station supports an extended discontinuous reception (eDRX) capability for the UE.

In some examples, the processor is further configured to provide an indication of the UE capability associated with the UE to the serving base station. When the UE is in a connected state, the processor is further configured to receive, information about the neighbor base station from the serving base station, where the serving base station determines that the UE capability meets the UE capability condition associated with the neighbor base station. Afterwards, the processor is configured to store the information about the neighbor base station, and perform the second measurement of the second reference signal from the neighbor base station responsive to the UE transitioning to an idle state.

Some aspects of this disclosure relate to a method performed by a UE. The method includes receiving, from a serving base station, a first system information, where the first system information includes a UE capability condition associated with a neighbor base station of one or more neighbor base stations. The method further includes determining whether a UE capability meets the UE capability condition associated with the neighbor base station. Moreover, the method includes performing a first measurement of a first reference signal received from the serving base station. The method also includes performing a second measurement of a second reference signal received from the neighbor base station responsive to the UE capability meeting the UE capability condition associated with the neighbor base station. Afterwards, the method includes obtaining a second system information from the neighbor base station responsive to the first measurement and the second measurement meeting a threshold condition.

Some aspects of this disclosure relate to non-transitory computer-readable medium storing instructions. When executed by a processor of a UE, the instructions stored in the non-transitory computer-readable medium cause the UE to perform various operations. The operations include receiving, from a serving base station, a first system information, where the first system information includes a UE capability condition associated with a neighbor base station of one or more neighbor base stations. The operations further include determining whether a UE capability meets the UE capability condition associated with the neighbor base station. Moreover, the operations include performing a first measurement of a first reference signal received from the serving base station. The operations also include performing a second measurement of a second reference signal received from the neighbor base station responsive to the UE capability meeting the UE capability condition associated with the neighbor base station. Afterwards, the operations include obtaining a second system information from the neighbor base station responsive to the first measurement and the second measurement meeting a threshold condition.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

In a wireless system, e.g., the fifth generation (5G) New Radio (NR) technology, a user equipment (UE) can have reduced capability (RedCap) compared to a regular UE, which results in lower cost and complexity, smaller form factor, and longer battery life for the RedCap UE. Many applications, such as industrial wireless sensor networks, video surveillance, wearables, or more, may benefit from RedCap UEs. A UE capability may be specified in various ways, including: a number of antenna ports of the UE, a data rate that can be associated with the UE, a latency requirement of the UE, or other performance capabilities.

A base station can support various types of UEs, including regular UEs and RedCap UEs. A base station can specify the types of UEs it supports by a UE capability condition, which can be specified in various ways. For example, a base station can specify a UE capability condition by listing a set of UE capabilities that are not allowed to access the base station, which may be called access restrictions. Alternatively, a base station can specify a UE capability condition by listing a set of UE capabilities that are allowed to access the base station. For example, a UE capability condition can specify the base station supports UEs with two receiver antenna ports, but does not support a UE with only one receiver antenna port. A base station can provide UE capability condition in the broadcast information, e.g., master information block (MIB), or system information block (SIB) 1.

In some wireless systems, e.g., NR technology, a UE can be in various states or operational modes. For example, a UE can be in an idle state, an inactive state, or a connected state, where a state can be referred to as a mode as well. UE mobility or UE handover can be managed differently when the UE is in different states. A UE handover from the serving base station to a neighbor base station can also be referred to as a re-selection of a base station.

When a UE is in a connected mode, the UE can perform measurements, and report the measurements on the measurement objects to the serving base station to make a decision for the handover. The UE can report the measurements in a periodic manner or when the UE is triggered by an event. For example, a UE can be triggered to report the measurements when the signal strength from a neighbor base station is better than the serving base station by a predetermined offset for a period of time.

When a UE is in an idle mode or an inactive mode, the UE may not have explicit knowledge of the serving base station to manage the handover or mobility of the UE. Since the UE is in an idle mode, there may not be an established connection between the UE and the serving base station. Instead, the UE may just be registered or camped with the serving base station. UE can still listen to information broadcast by the serving base station or neighbor base stations. Based on the broadcast information or signals, the UE can perform various measurements, but does not report any measurements. The UE can use the measurements to decide if it wants to re-select a neighbor cell over the serving cell. Once a UE decides to handover to the neighbor cell, the UE does not inform the neighbor cell about the re-selection. Rather, the UE just starts listening to the broadcast channels of the neighbor cell for paging, for broadcast reception etc., which indicates the UE has performed the handover in the idle state.

In some embodiments, the UE can periodically measure signals from the neighbor base station, which can be provided in the same frequency as the serving base station or in a different frequency. If the neighbor base station provides better signal strength that may satisfy a threshold condition between the measurements of signals from the serving base station and the measurements of signals from the neighbor base station, the UE can start to obtain the broadcast system information from the neighbor base station. The broadcast system information from the neighbor base station can contain the UE capability condition associated with the neighbor base station. After the UE obtains the broadcast system information from the neighbor base station, and determines that the UE capability meets the UE capability condition associated with the neighbor base station, the UE completes the handover to the neighbor base station, so that the neighbor base station is the serving cell after the handover.

However, if the UE capability does not meet the UE capability condition associated with the neighbor base station, it would be a waste of energy for the UE to perform the measurements of signals from the neighbor base station. Even if the neighbor base station has higher signal quality, the neighbor base station does not support the UE since the UE capability does not meet the UE capability condition associated with the neighbor base station.

In some embodiments, an improved mechanism can be provided. A system information from the serving base station can include a UE capability condition associated with a neighbor base station. The UE can determine whether a UE capability meets the UE capability condition associated with the neighbor base station. When the UE capability meets the UE capability condition associated with the neighbor base station, the UE can perform a measurement of a reference signal received from the neighbor base station. In this way, the UE may not perform the measurement of a reference signal received from the neighbor base station when the UE capability does not meet the UE capability condition to save energy. In addition, there may be a threshold condition with respect to relative signal strengths determined between a measurement of a reference signal received from the serving base station and the measurement of a reference signal received from the neighbor base station. If the threshold condition is satisfied, the UE can obtain a system information from the neighbor base station. The UE can obtain the broadcast system information by listening to the neighbor base station, read the broadcast system information, and/or decode the broadcast system information.

The system information from the serving base station can include corresponding UE capability conditions associated with one or more neighbor base stations. If the UE meets the UE capability conditions associated with one or more neighbor base stations, the UE can perform measurements of the corresponding references signals, and select a neighbor base station as a potential next serving base station, when the measurement of a reference signal from the selected neighbor base station satisfies a threshold condition. Afterwards, the UE can obtain the system information from the selected neighbor base station, indicating the UE has performed the handover to the selected neighbor base station at the idle state or inactive state.

Figure 1:
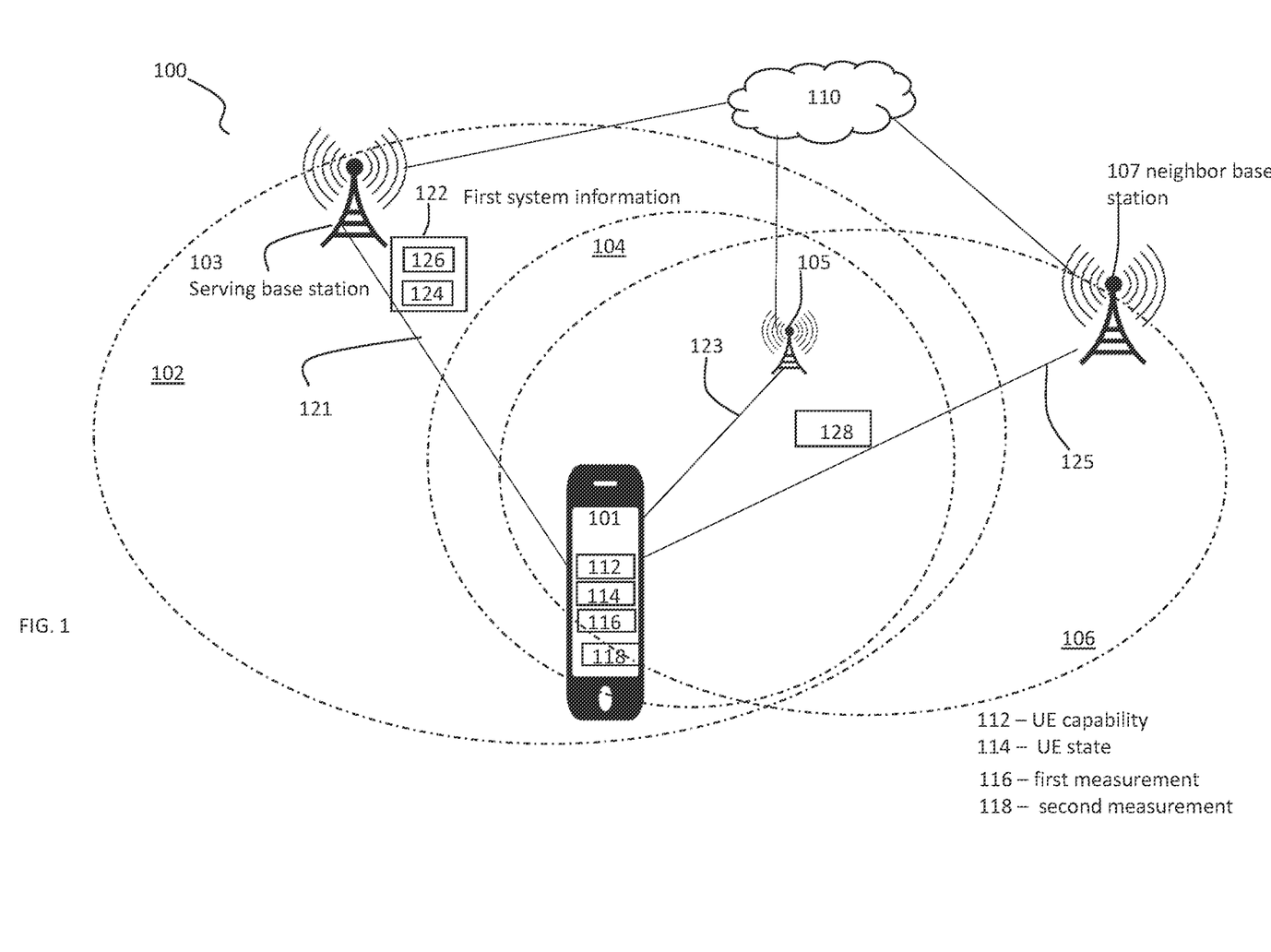
FIG. 1 illustrates a wireless system including a user equipment (UE) configured to handover from communicating with a serving base station to a neighbor base station, according to some aspects of the disclosure.

FIG. 1 illustrates a wireless system 100 including a UE, e.g., UE 101, configured to handover from communicating with a serving base station to a neighbor base station, according to some aspects of the disclosure. Wireless system 100 is provided for the purpose of illustration only and does not limit the disclosed aspects. Wireless system 100 can include, but is not limited to, UE 101, a base station 103, a base station 105, and a base station 107, all communicatively coupled to a core network 110. UE 101 communicates with base station 103 over a carrier 121, communicates with base station 105 over a carrier 123, and communicates with base station 107 over a carrier 125.

In some examples, wireless system 100 can be a NR system, a LTE system, a 5G system, or some other wireless system. There can be other network entities, e.g., network controller, a relay station, not shown. Wireless system 100 can support a wide range of use cases such as enhanced mobile broad band (eMBB), massive machine type communications (mMTC), ultra-reliable and low-latency communications (URLLC), and enhanced vehicle to anything communications (eV2X). Wireless system 100 can also support industrial wireless sensor networks, video surveillance, or wearables, where UE 101 can be a RedCap UE with lower cost and complexity, smaller form factor, and longer battery life.

According to some aspects, base station 103, base station 105, and base station 107 can be a fixed station or a mobile station. Base station 103, base station 105, and base station 107 can also be called other names, such as a base transceiver system (BTS), an access point (AP), a transmission/reception point (TRP), an evolved NodeB (eNB), a next generation node B (gNB), a 5G node B (NB), or some other equivalent terminology. In some examples, base station 103, base station 105, and base station 107 can be interconnected to one another and/or to other base station or network nodes in a network through various types of backhaul interfaces such as a direct physical connection, a virtual network, and/or the like, not shown.

According to some aspects, UE 101 can be stationary or mobile. UE 101 can be a cellular phone (e.g., a smart phone), a personal digital assistant (PDA), a wireless modem, a wireless communication device, a handheld device, a laptop, a desktop, a cordless phone, a wireless local loop station, a wireless sensor, a tablet, a camera, a video surveillance camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC)

device, or any other suitable device that is configured to communicate via a wireless medium. For example, a MTC and eMTC device can include, a robot, a drone, a location tag, and/or the like.

According to some aspects, base station 103, base station 105, and base station 107 can be communicatively coupled to core network 110. Base station 103 can serve a cell 102, base station 105 can serve a cell 104 contained within cell 102, and base station 107 can serve a cell 106 that overlaps with cell 102 and cell 104. In some other embodiments, cell 102 can overlap partially with cell 104. Cell 102, cell 104, and cell 106 can be a macro cell, a pico cell, a femto cell, and/or another type of cell. In comparison, a macro cell can cover a relatively large geographic area, e.g., several kilometers in radius, a femto cell can cover a relatively small geographic area, e.g., a home, while a pico cell covers an area smaller than the area covered by a macro cell but larger than the area covered by a femto cell. For example, cell 102 and cell 106 can be a macro cell, and cell 104 can be a pico cell or a femto cell. In addition, cell 102 and cell 106 can be a pico cell and cell 104 can be a femto cell. In some examples, the geographic area of a cell can move according to the location of a mobile base station.

According to some aspects, base station 103 can be the serving base station and cell 102 can be the serving cell or primary cell. Base station 105 and base station 107 can be neighbor base station to UE 101. Cell 104 can be a secondary cell, or a primary secondary cell. There can be other secondary cells for UE 101, not shown. Data for UE 101 can be simultaneously transferred between UE 101 and core network 110 by a radio connection between UE 101 and base station 103 at carrier 121, a radio connection between UE 101 and base station 105 at carrier 123, and a radio connection between UE 101 and base station 107 at carrier 125. UE 101 can communicate with the serving base station, e.g., base station 103, using a first frequency band, and communicate with a neighbor base station, e.g., base station 105 or base station 107 using a second frequency band different from the first frequency band.

According to some aspects, UE 101 can receive a first system information 122 from the serving base station, e.g., base station 103. The first system information 122 can include a UE capability condition 124 associated with a neighbor base station, e.g., base station 107. UE 101 is registered with base station 103 and can be in an idle state, the first system information 122 can be broadcast information received from base station 103. The first system information 122 can include information carried by SIB 3 or SIB 4. The first system information 122 can further include an indication on whether the neighbor base station, e.g., base station 107, supports an extended discontinuous reception (eDRX) capability for the UE. Base station 107 can indicate to base station 103 UE capability condition 124 and its capability to support eDRX by communication through core network 110.

UE 101 can include a UE capability 112, and a UE state 114. UE 101 can be in various state, an idle state, an inactive state, a connected state, or other states. In some examples, an idle state can be used an example for descriptions. Descriptions about an idle state can be equally applicable to other states, e.g., an inactive state. UE capability 112 can include various parameters describing the capability of UE 101, e.g., a number of receive antenna ports or transmit antenna ports of UE 101, a data rate that can be associated with UE 101, a latency requirement of UE 101, or a bandwidth used by UE 101, or more. For example, the number of receive antenna ports and the number of transmit antenna ports of UE 101 may be the same, and simply referred to as a number of antenna ports of UE 101. UE 101 can determine whether UE capability 112 meets UE capability condition 124 associated with the neighbor base station, e.g., base station 107.

According to some aspects, UE 101 can perform a first measurement 116 of a first reference signal received from the serving base station, e.g., base station 103. When UE 101 determines that UE capability 112 meets UE capability condition 124, UE 101 can perform a second measurement 118 of a second reference signal received from the neighbor base station, e.g., base station 107.

For network operations such as handover to a neighbor cell, it is desirable to measure cell quality, such as reference signal received power (RSRP) or reference signal received quality (RSRQ) for neighbor cells or cell quality of the serving cell. UE 101 can perform various measurements. With NR, the cell quality can be measured by using SS/PBCH blocks (SSB). These are composed of a synchronization signal (SS) and the physical broadcast Channel (PBC). According to some aspects, UE 101 can measure a reference signal. In some example, the reference signal can be a synchronizations block (SSB) including Synchronization Signal based Reference Signal Received Power (SS-RSRP), Synchronization Signal based Reference Signal Received Quality (SS-RSRQ), Synchronization Signal based Signal to Noise and Interference Ratio (SS-SINR), Synchronization Signal based Signal to Noise and Interference Ratio (SS-SINR), or Received (linear) average power of the resource elements that carry NR SSB signals and channels (SSB_RP).

However, in some examples, when UE capability 112 does not meet UE capability condition 124, UE 101 does not perform the second measurement 118. When UE capability 112 does not meet UE capability condition 124, UE 101 cannot be handed over to the neighbor base station due to the limitations on the support of UE capability provided by the neighbor base station. Therefore, even if UE 101 performs the second measurement 118, the data will not be useful.

According to some aspects, the first system information 122 can include a threshold condition 126 associated with the first measurement 116 and the second measurement 118. In some examples, the threshold condition specifies an offset between the first measurement 116 and the second measurement 118, where the offset can be specified as a difference between signal strengths of the first measurement 116 and the second measurement 118, e.g. as measured in decibel milliwatts (dBm).

According to some aspects, when the first measurement and the second measurement meet the threshold condition 126, UE 101 can obtain a second system information 128 from the neighbor base station, e.g., base station 107. The second system information 128 can be a second broadcast information received from the neighbor base station. The second system information 128 can include information carried by Master Information Block (MIB) or SIB 1, and can be used for paging, for broadcast reception etc. By listening and obtaining the second system information 128, UE 101 has performed the handover from serving base station to the neighbor base station in the idle state.

According to some aspects, there can be more than one neighbor base station besides base station 105 and base station 107. The first system information 122 can further include a second UE capability condition associated with a second neighbor base station. When UE capability 112 meets the second UE capability condition associated with the second neighbor base station, UE 101 can perform a third measurement on a third reference signal from the second neighbor base station. Afterwards, UE 101 can select a next neighbor base station from the first neighbor base station and the second neighbor base station based on the first measurement, the second measurement, the third measurement, and the threshold condition, and obtain the second system information from the next neighbor base station. In some examples, UE 101 can select the first neighbor base station to be the next neighbor base station when the second measurement is stronger than the third measurement.

According to some aspects, UE 101 can have a UE state 114 to be a connected state. During the connected state, UE 101 and base station 103 can communicate and exchange data. UE 101 can provide an indication of the UE capability associated with the UE to the serving base station. The serving base station, e.g., base station 103, can determine that UE capability 112 meets UE capability condition 124 associated with the neighbor base station, e.g., base station 107. In addition, UE 101 can receive information about base station 107 from base station 103, store the information about base station 107, and later perform the second measurement 128 of the second reference signal from base station 107 when UE 101 transitioning to an idle state.

Figure 2:
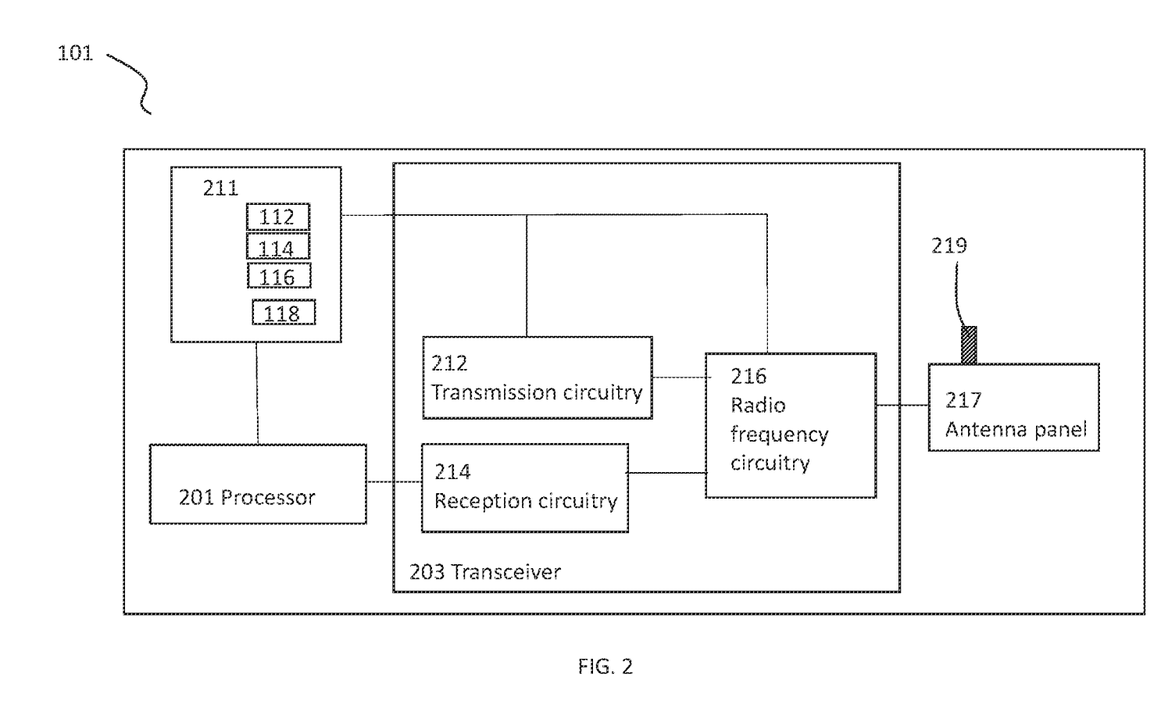
FIG. 2 illustrates a block diagram of a UE to perform functions described herein, according to some aspects of the disclosure.

FIG. 2 illustrates a block diagram of UE 101, having antenna panel 217 including one or more antenna elements, e.g., an antenna element 219 coupled to transceiver 203 and controlled by processor 201. In detail, transceiver 203 can include radio frequency (RF) circuitry 216, baseband transmission circuitry 212, and baseband reception circuitry 214. RF circuitry 216 can include multiple parallel RF chains for one or more of transmit or receive functions, each connected to one or more antenna elements of the antenna panel. In addition, processor 201 can be communicatively coupled to a memory device 211, which are further coupled to the transceiver 203.

In some examples, RF circuitry 216 is used by UE 101 to perform measurements of reference signals, and to transmit and receive data in the serving cell. Memory device 211 can store UE capability 112, UE state 114, the first measurement 116 and the second measurement 118. Memory device 211 can include instructions, that when executed by the processor 201 perform the functions to implement a handover from a serving base station to a neighbor base station described herein. Alternatively, the processor 201 can be "hard-coded" to perform the functions described herein.

Figure 3:
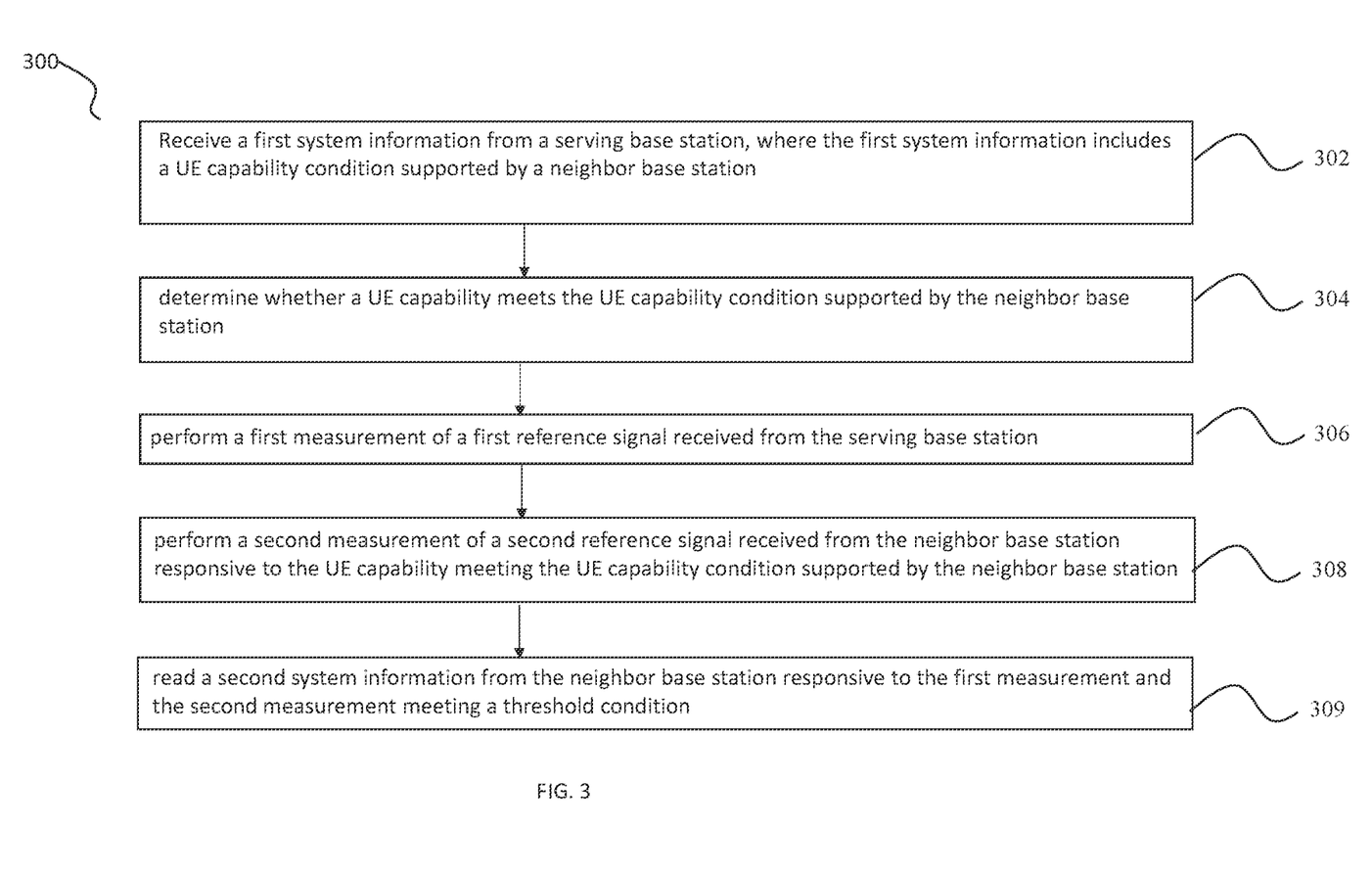
FIG. 3 illustrates an example method performed by a UE to handover from communicating with a serving base station to a neighbor base station, according to some aspects of the disclosure.

FIG. 3 illustrates an example method 300 performed by a UE to handover from a serving base station to a neighbor base station, according to some aspects of the disclosure. Method 300 can be performed by UE 101 as shown in FIGS. 1-2.

At 302, UE 101 can receive a first system information from a serving base station, where the first system information includes a UE capability condition associated with a neighbor base station. For example, UE 101 can receive the first system information 122 from base station 103, which is the serving base station. The first system information 122 includes UE capability condition 124 associated with a neighbor base station, e.g., base station 107.

At 304, UE 101 can determine whether a UE capability meets the UE capability condition associated with the neighbor base station. For example, UE 101 can determine whether UE capability 112 meets UE capability condition 124 associated with base station 107. The UE capability and the corresponding condition can comprise one or more of a number of antenna ports of the UE, a data rate of the UE, or a latency requirement of the UE.

At 306, UE 101 can perform a first measurement of a first reference signal received from the serving base station. For example, UE 101 can perform the first measurement 116 of a first reference signal received from base station 103.

At 308, UE 101 can perform a second measurement of a second reference signal received from the neighbor base station responsive to the UE capability meeting the UE capability condition associated with the neighbor base station. For example, when UE capability 112 meets UE capability condition 124, UE 101 can perform the second measurement 118 of a second reference signal received from base station 107.

At 309, UE 101 can obtain a second system information from the neighbor base station responsive to the first measurement and the second measurement meeting a threshold. For example, when the first measurement 116 and the second measurement 118 satisfy threshold condition 126, UE 101 can obtain the second system information 128 from base station 107. In some examples, threshold condition 126 specifies an offset between the first measurement 116 and the second measurement 118, where the offset can be specified as a difference between a signal strength of the first measurement 116 and the signal strength of the second measurement 118, e.g. as measured in decibel milliwatts (dBm). When UE 101 is in an idle state and obtains the second system information 128, UE has performed the handover from base station 103 to base station 107. In an embodiment, the UE 101 does not inform the neighbor base station 107 about the re-selection.

Figure 4:
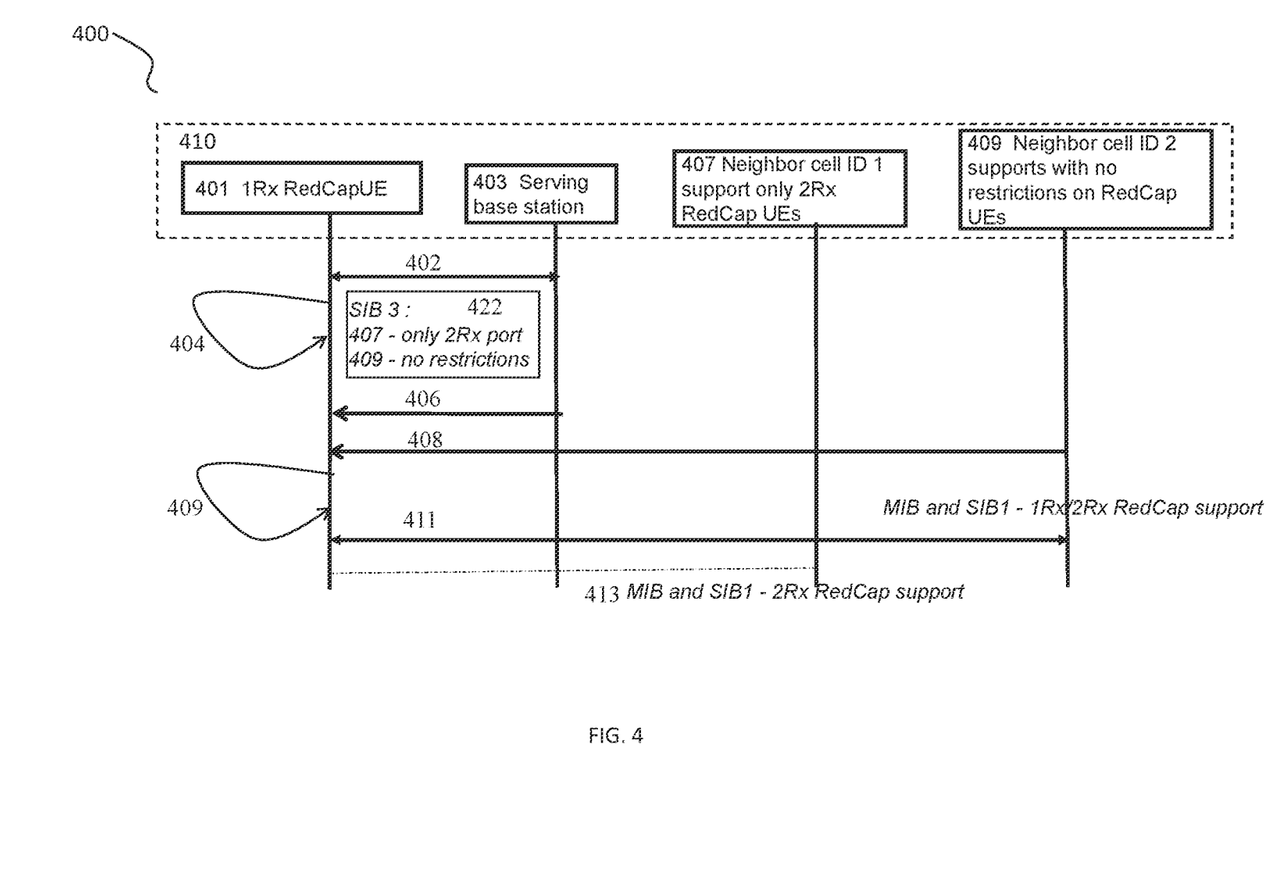
FIG. 4 illustrates an example sequence diagram illustrating operations performed by a UE, a serving base station, and one or more neighbor base stations, according to some aspects of the disclosure.

FIG. 4 illustrates an example sequence diagram 400 illustrating operations performed by a UE 401, a serving base station 403, and one or more neighbor base stations, according to some aspects of the disclosure. Sequence diagram 400 is an example of method 300 shown in FIG. 3. UE 401, base station 403, base station 407, and base station 409 can form a wireless system 410, where UE 401 is a RedCap UE with only one receiver antenna port. Wireless system 410 is similar to wireless system 100 shown in FIG. 1.

At 402, UE 401 can receive a first system information 422 from serving base station 403. The first system information 422 includes a UE capability condition for base station 407 and a UE capability condition for base station 409. The UE capability condition for base station 407 specifies that base station 407 can only support a UE with at least 2 receiver antenna ports, while the UE capability condition for base station 409 specifies that base station 409 can support a UE with any capability without any restriction, including supporting a UE with only one antenna port. The first system information 422 includes information carried by SIB 3.

At 404, UE 401 can determine whether a UE capability meets the UE capability condition associated with the neighbor base station. In detail, UE 401 can determine that UE 401 does not meet the UE capability condition for base station 407 because the UE capability condition for base station 407 requires at least 2 receiver antenna ports, while UE 401 has only one receiver antenna port. On the other hand, UE 401 can determine that UE 401 meets the UE capability condition for base station 409 because the UE capability condition for base station 409 does not have any restrictions and can support any RedCap UE.

At 406, UE 401 can perform a first measurement of a first reference signal received from the serving base station 403.

At 408, UE 401 can perform a second measurement of a second reference signal received from the neighbor base station 409 responsive to the UE capability of UE 401 meeting the UE capability condition associated with neighbor base station 409. On the other hand, UE 401 does not perform a measurement of a reference signal received from the neighbor base station 407 because the UE capability of UE 401 does not meet the UE capability condition associated with neighbor base station 407.

At 409, UE 401 can determine whether the first measurement and the second measurement meet a threshold condition, where the threshold condition can be included in the first system information 422. For example, the threshold condition may specify the second measurement of the reference signal from neighbor base station 409 to be stronger or have a higher signal quality than the first measurement of the reference signal from serving base station 403 by an offset. For example, the offset can be a difference in measured signal strengths indicated the first and second measurements.

At 411, when the first measurement and the second measurement satisfy the threshold condition, UE 401 can obtain a second system information from the neighbor base station 409. When UE 401 is in an idle state and obtains the second system information from the neighbor base station 409, UE 401 has performed the handover from base station 403 to base station 409. In an embodiment, the UE 401 does not inform the neighbor base station 409 about the re-selection.

At 413, base station 407 may still broadcast system information to UE 401, but UE 401 may not perform any operations on the broadcasted system information from base station 407 because UE 401 does not meet the UE capability condition for base station 407.

Figure 5:
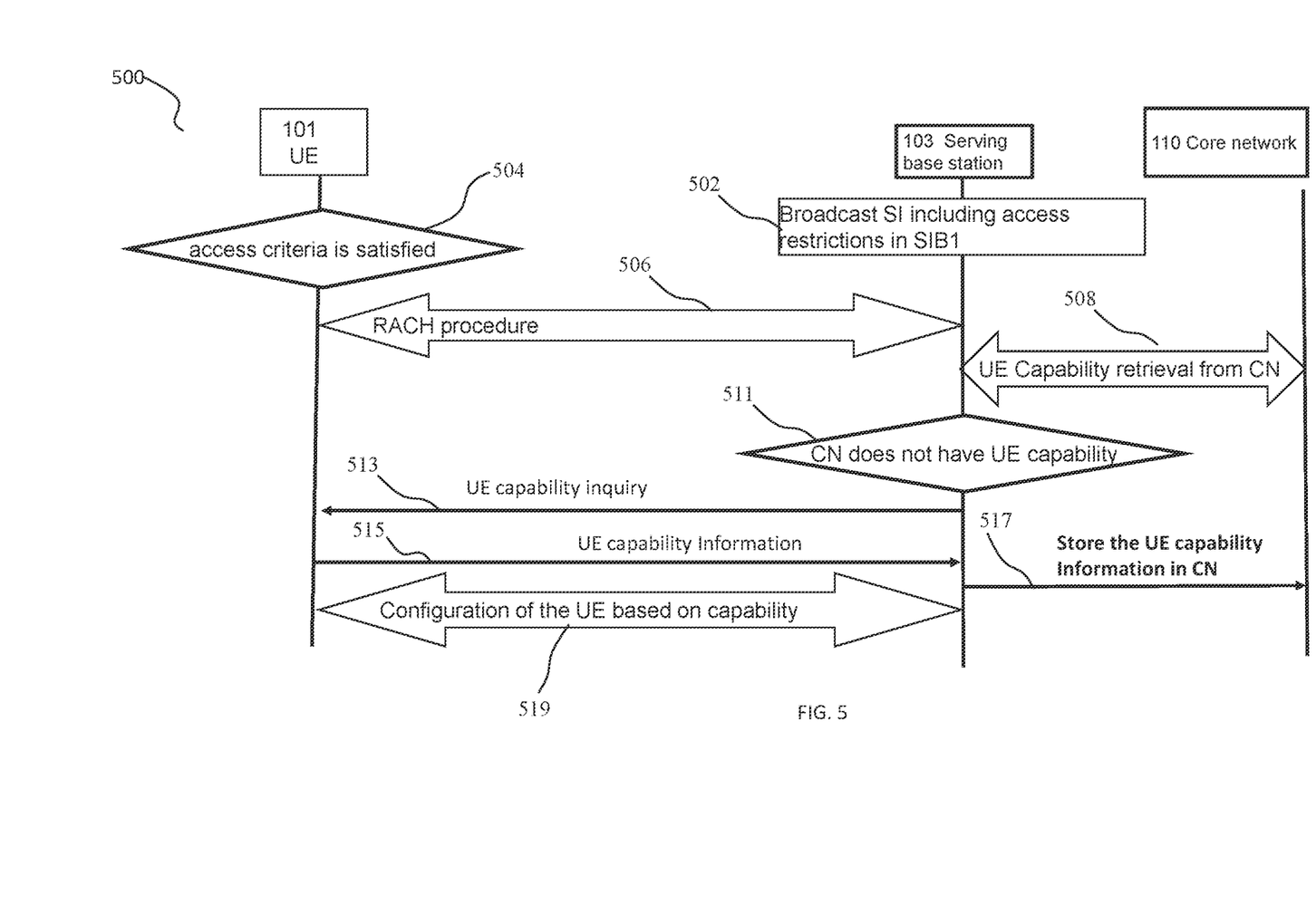
FIG. 5 illustrates an example sequence diagram illustrating operations performed by a UE, a serving base station, and core network to register the UE with UE capability, according to some aspects of the disclosure.

FIG. 5 illustrates an example sequence diagram 500 illustrating operations performed by UE 101, base station 103 as a serving base station, and core network 110. The operations in diagram 500 illustrate the registration of UE 101 having a UE capability, according to some aspects of the disclosure.

At 502, base station 103 can broadcast the system information including a UE capability condition for base station 103, and UE 101 can receive the system information including the UE capability condition. The UE capability condition can be an access restriction for the base station 103.

At 504, UE 101 can determine that the UE capability of UE 101 satisfies the UE capability condition of base station 103, and meets the access criteria. Once the UE capability condition of base station 103 is satisfied, UE 101 can register with base station 103.

At 506, UE 101 and base station 103 can perform operations to establish a random access channel (RACH) between UE 101 and base station 103.

At 508, base station 103 can retrieve from core network 110 any saved UE capability for UE 101.

At 511, base station 103 can determine that core network 110 does not have the UE capability saved for UE 101.

At 513, base station 103 can send an inquiry to UE 101 for its UE capability.

At 515, UE 101 can provide an indication of the UE capability associated with UE 101 to base station 103.

At 517, base station 103 can send the UE capability to core network 110 to store the UE capability information into core network 110.

At 519, UE 101 and base station 103 can perform operations to configure UE 101 based on the UE capability.

In addition, UE 101 can perform other operations. For example, UE 101 can receive, responsive to the UE being in a connected state, information about the neighbor base station from the serving base station, wherein the serving base station determines that the UE capability meets the UE capability condition associated with the neighbor base station; store the information about the neighbor base station; and perform the second measurement of the second reference signal from the neighbor base station responsive to the UE transitioning to an idle state.

Figure 6:
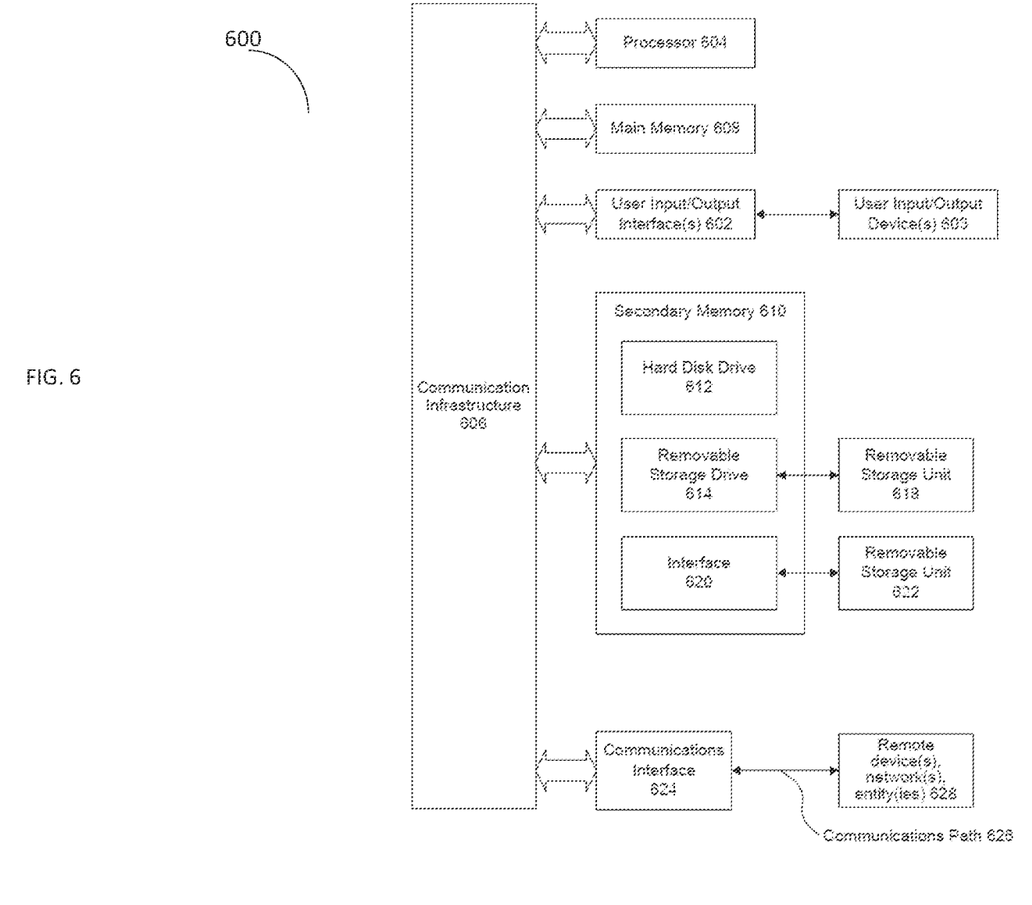
FIG. 6 is an example computer system for implementing some aspects or portion(s) thereof of the disclosure provided herein.

Various aspects can be implemented, for example, using one or more computer systems, such as computer system 600 shown in FIG. 6. Computer system 600 can be any computer capable of performing the functions described herein such as UE 101, base station 103, base station 105, or base station 107 as shown in FIG. 1 and FIG. 2. Computer system 600 includes one or more processors (also called central processing units, or CPUs), such as a processor 604. Processor 604 is connected to a communication infrastructure 606 (e.g., a bus). Computer system 600 also includes user input/output device(s) 603, such as monitors, keyboards, pointing devices, etc., that communicate with communication infrastructure 606 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some aspects, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 608, the removable storage unit 618, the removable storage unit 622 can store instructions that, when executed by processor 604, cause processor 604 to perform operations for a UE or a base station, e.g., UE 101, base station 103, or base station 105 as shown in FIG. 1 and FIG. 2. In some examples, the operations include those operations illustrated and described in FIGS. 3-5.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626. Operations of the communication interface 624 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 6. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE), comprising:
    a transceiver configured to enable wireless communication with a serving base station and one or more neighbor base stations; and
    a processor communicatively coupled to the transceiver and configured to:
        receive, using the transceiver, a first system information from the serving base station, wherein the first system information includes a UE capability condition associated with a neighbor base station of the one or more neighbor base stations, wherein the UE capability condition includes a parameter describing a number of receive antenna ports or transmit antenna ports of the UE;
        determine whether a UE capability meets the UE capability condition associated with the neighbor base station;
        perform a first measurement of a first reference signal received from the serving base station;
        perform a second measurement of a second reference signal received from the neighbor base station without reporting the second measurement responsive to the UE capability meeting the UE capability condition associated with the neighbor base station;

decide to handover to the neighbor base station without informing the neighbor base station about the handover responsive to the first measurement and the second measurement meeting a threshold condition; and obtain a second system information from the neighbor base station.

2. The UE of claim 1, wherein the neighbor base station is a first neighbor base station, the UE capability condition is a first UE capability condition, and the first system information further includes a second UE capability condition associated with a second neighbor base station, and wherein the UE capability does not meet the second UE capability condition.

3. The UE of claim 1, wherein the UE is registered with the serving base station and is in an idle state, the first system information is a first broadcast information received from the serving base station, and the second system information is a second broadcast information received from the neighbor base station.

4. The UE of claim 1, wherein the first system information includes information carried by System Information Block (SIB) 3 or SIB 4, and the second system information includes information carried by Master Information Block (MIB) or SIB 1.

5. The UE of claim 1, wherein the first system information includes the threshold condition, and the threshold condition specifies an offset between the first measurement and the second measurement.

6. The UE of claim 1, wherein the UE communicates with the serving base station using a first frequency band, and the UE communicates with the neighbor base station using a second frequency band.

7. The UE of claim 1, wherein the neighbor base station is a first neighbor base station, the UE capability condition is a first UE capability condition, and the first system information further includes a second UE capability condition associated with a second neighbor base station, and the processor is further configured to:

perform a third measurement on a third reference signal from the second neighbor base station responsive to the UE capability meeting the second UE capability condition associated with the second neighbor base station;

select a next neighbor base station from one of the first neighbor base station and the second neighbor base station based on the first measurement, the second measurement, the third measurement, and the threshold condition; and obtain the second system information from the next neighbor base station.

8. The UE of claim 7, wherein the processor is further configured to select the first neighbor base station to be the next neighbor base station responsive to the second measurement being stronger than the third measurement.

9. The UE of claim 1, wherein the UE capability comprises the number of receive antenna ports or transmit antenna ports of the UE, a data rate of the UE, or a latency requirement of the UE.

10. The UE of claim 1, wherein the processor is further configured to:

provide an indication of the UE capability to the serving base station.

11. The UE of claim 1, wherein the processor is further configured to:

receive, responsive to the UE being in a connected state, information about the neighbor base station from the serving base station, wherein the serving base station determines that the UE capability meets the UE capability condition associated with the neighbor base station;

store the information about the neighbor base station; and perform the second measurement of the second reference signal from the neighbor base station responsive to the UE transitioning to an idle state.

12. The UE of claim 1, wherein the first system information from the serving base station further includes an indication on whether the neighbor base station supports an extended discontinuous reception (eDRX) capability for the UE.

13. A method of operating of a user equipment (UE), comprising:

receiving, from a serving base station, a first system information, wherein the first system information includes a UE capability condition associated with a neighbor base station of one or more neighbor base stations, wherein the UE capability condition includes a parameter describing a number of receive antenna ports or transmit antenna ports of the UE;

determining whether a UE capability meets the UE capability condition associated with the neighbor base station;

performing a first measurement of a first reference signal received from the serving base station;

performing a second measurement of a second reference signal received from the neighbor base station without reporting the second measurement responsive to the UE capability meeting the UE capability condition associated with the neighbor base station;

deciding to handover to the neighbor base station without informing the neighbor base station about the handover responsive to the first measurement and the second measurement meeting a threshold condition; and obtaining a second system information from the neighbor base station.

14. The method of claim 13, wherein the neighbor base station is a first neighbor base station, the UE capability condition is a first UE capability condition, and the first system information further includes a second UE capability condition associated with a second neighbor base station, and wherein the UE capability does not meet the second UE capability condition.

15. The method of claim 13, wherein the UE is registered with the serving base station and is in an idle state, the first system information is a first broadcast information received from the serving base station, and the second system information is a second broadcast information received from the neighbor base station.

16. The method of claim 13, wherein the first system information includes information carried by System Information Block (SIB) 3 or SIB 4, and the second system information includes information carried by Master Information Block (MIB) or SIB 1.

17. The method of claim 13, wherein the neighbor base station is a first neighbor base station, the UE capability condition is a first UE capability condition, and the first system information further includes a second UE capability condition associated with a second neighbor base station, and the method further comprises:

performing a third measurement on a third reference signal from the second neighbor base station responsive to the UE capability meeting the second UE capability condition associated with the second neighbor base station;

selecting a next neighbor base station from one of the first neighbor base station and the second neighbor base station based on the first measurement, the second measurement, the third measurement, and the threshold condition; and obtaining the second system information from the next neighbor base station.

18. The method of claim 13, wherein the UE capability comprises the number of receive antenna ports or transmit antenna ports of the UE, a data rate of the UE, or a latency requirement of the UE.

19. A non-transitory computer-readable medium storing instructions that, when executed by a processor of a user equipment (UE), cause the UE to perform operations, the operations comprising:

receiving, from a serving base station, a first system information, wherein the first system information includes a UE capability condition associated with a neighbor base station of one or more neighbor base stations, wherein the UE capability condition includes a parameter describing a number of receive antenna ports or transmit antenna ports of the UE;

determining whether a UE capability meets the UE capability condition associated with the neighbor base station;

performing a first measurement of a first reference signal received from the serving base station;

performing a second measurement of a second reference signal received from the neighbor base station without reporting the second measurement responsive to the UE capability meeting the UE capability condition associated with the neighbor base station;

deciding to handover to the neighbor base station without informing the neighbor base station about the handover responsive to the first measurement and the second measurement meeting a threshold condition; and obtaining a second system information from the neighbor base station.

20. The non-transitory computer-readable medium of claim 19, wherein the neighbor base station is a first neighbor base station, the UE capability condition is a first UE capability condition, and the first system information further includes a second UE capability condition associated with a second neighbor base station, and the operations further comprises:

performing a third measurement on a third reference signal from the second neighbor base station responsive to the UE capability meeting the second UE capability condition associated with the second neighbor base station;

selecting a next neighbor base station from one of the first neighbor base station and the second neighbor base station based on the first measurement, the second measurement, the third measurement, and the threshold condition; and obtaining the second system information from the next neighbor base station.

* * * * *